US010577523B2

(12) United States Patent
Miller et al.

(10) Patent No.: US 10,577,523 B2
(45) Date of Patent: Mar. 3, 2020

(54) RELATING TO THERMOSETTING ADHESIVE FILMS

(71) Applicant: Zephyros, Inc., Romeo, MI (US)

(72) Inventors: Ira Miller, Molsheim (FR); Michael Czaplicki, Molsheim (FR); Michel Awkal, Molsheim (FR)

(73) Assignee: ZEPHYROS, INC., Romeo, MI (US)

( * ) Notice: Subject to any disclaimer, the term of this patent is extended or adjusted under 35 U.S.C. 154(b) by 49 days.

(21) Appl. No.: 14/907,164

(22) PCT Filed: Jul. 25, 2014

(86) PCT No.: PCT/IB2014/063427
§ 371 (c)(1),
(2) Date: Jan. 22, 2016

(87) PCT Pub. No.: WO2015/011686
PCT Pub. Date: Jan. 29, 2015

(65) Prior Publication Data
US 2016/0160087 A1   Jun. 9, 2016

(30) Foreign Application Priority Data

Jul. 26, 2013   (GB) .................................. 1313328.5
Feb. 24, 2014   (GB) .................................. 1403160.3
Feb. 24, 2014   (GB) .................................. 1403163.7

(51) Int. Cl.
*C09J 7/00*   (2018.01)
*C09J 163/00*   (2006.01)
(Continued)

(52) U.S. Cl.
CPC ................. *C09J 7/00* (2013.01); *C08J 5/128* (2013.01); *C09J 5/00* (2013.01); *C08J 2363/00* (2013.01);
(Continued)

(58) Field of Classification Search
CPC .................... C08J 2363/00; C08J 2367/00; C08J 2463/00; C08J 5/128; C09J 163/00;
(Continued)

(56) References Cited

U.S. PATENT DOCUMENTS 3,649,714 A    3/1972   Wangsness
3,707,583 A   12/1972   McKown
(Continued)

FOREIGN PATENT DOCUMENTS

CA   2425414 A1   4/2002
CN   1929990 A    3/2007
(Continued)

OTHER PUBLICATIONS

International Preliminary Report on Patentability dated Oct. 12, 2010; for Corresponding PCT Application No. PCT/EP2009/002546 filed Apr. 7, 2009.
(Continued)

*Primary Examiner* — John D Freeman
(74) *Attorney, Agent, or Firm* — The Dobrusin Law Firm, P.C.; Bryan S. Lemanski (57) ABSTRACT

Flexible films of thermosetting adhesive materials which are non-tacky to the touch are storage stable at room temperature and can be cured at elevated temperature with a short cure time and can be cured to produce a tough flexible adhesive layer including bonding to oily surfaces, the materials are particularly useful in bonding together dissimilar substrates.

20 Claims, 1 Drawing Sheet

(51) Int. Cl.
    *C09J 171/00* (2006.01)
    *C09J 5/00* (2006.01)
    *C08J 5/12* (2006.01)
(52) U.S. Cl.
    CPC ........ *C08J 2367/00* (2013.01); *C08J 2463/00*
        (2013.01); *C09J 163/00* (2013.01); *C09J*
        *171/00* (2013.01); *C09J 2201/122* (2013.01);
        *C09J 2201/128* (2013.01); *C09J 2205/114*
        (2013.01); *C09J 2451/00* (2013.01); *C09J*
        *2463/00* (2013.01); *C09J 2463/006* (2013.01);
        *C09J 2467/006* (2013.01); *C09J 2471/00*
        (2013.01); *C09J 2477/006* (2013.01); *C09J*
        *2479/086* (2013.01); *Y10T 428/1476*
        (2015.01); *Y10T 428/31515* (2015.04)
(58) Field of Classification Search
    CPC .. C09J 171/00; C09J 171/08; C09J 2201/122;
        C09J 2201/128; C09J 2205/114; C09J
        2451/00; C09J 2461/00; C09J 2463/00;
        C09J 2463/006; C09J 2467/006; C09J
        2471/00; C09J 2477/006; C09J 2479/086;
        C09J 5/00; C09J 5/06; C09J 7/00; C09J
        7/21; C09J 7/35; Y10T 428/1476; Y10T
        428/31515
    See application file for complete search history.

(56) References Cited

U.S. PATENT DOCUMENTS

| | | | |
|---|---|---|---|
| 3,860,541 A | 1/1975 | Lehmann et al. | |
| 3,944,631 A | 3/1976 | Yu et al. | |
| 3,960,803 A | 6/1976 | Smith | |
| 3,984,497 A | 10/1976 | Owens et al. | |
| 3,985,703 A | 10/1976 | Ferry et al. | |
| 4,034,013 A | 7/1977 | Lane | |
| 4,096,202 A | 6/1978 | Farnham et al. | |
| 4,138,462 A | 2/1979 | Procida et al. | |
| 4,304,709 A | 12/1981 | Hooker et al. | |
| 4,306,040 A | 12/1981 | Baer | |
| 4,096,202 B1 | 8/1983 | Farnham et al. | |
| 4,427,481 A | 1/1984 | Smith et al. | |
| 4,495,324 A | 1/1985 | Chacko et al. | |
| 4,536,436 A | 8/1985 | Maeko et al. | |
| 4,538,380 A | 9/1985 | Colliander | |
| 4,601,769 A | 7/1986 | DeHoff | |
| 4,693,775 A | 9/1987 | Harrsion et al. | |
| 4,724,243 A | 2/1988 | Harrison et al. | |
| 4,749,434 A | 6/1988 | Harrison | |
| 4,766,183 A | 8/1988 | Rizk et al. | |
| 4,769,166 A | 9/1988 | Harrison | |
| 4,778,845 A | 10/1988 | Tschan et al. | |
| 4,833,191 A | 5/1989 | Bushway et al. | |
| 4,871,590 A | 10/1989 | Merz et al. | |
| 4,898,630 A | 2/1990 | Kitoh et al. | |
| 4,908,273 A | 3/1990 | Urech et al. | |
| 4,922,596 A | 5/1990 | Wycech | |
| 4,923,902 A | 5/1990 | Wycech | |
| 4,923,934 A | 5/1990 | Werner | |
| 4,978,562 A | 12/1990 | Wycech | |
| 4,995,545 A | 2/1991 | Wycech | |
| 5,074,913 A | 12/1991 | Trivett | |
| 5,086,088 A | 2/1992 | Kitano et al. | |
| 5,124,186 A | 6/1992 | Wycech | |
| 5,145,935 A | 9/1992 | Hayashi | |
| 5,164,472 A | 11/1992 | White et al. | |
| 5,194,502 A | 3/1993 | Saito et al. | |
| 5,240,645 A | 8/1993 | Strecker | |
| 5,266,133 A | 11/1993 | Hanley et al. | |
| 5,274,006 A | 12/1993 | Kagoshima et al. | |
| 5,275,853 A | 1/1994 | Silvis et al. | |
| 5,290,857 A | 3/1994 | Ashida et al. | |
| 5,331,062 A | 7/1994 | Sorathia et al. | |
| 5,342,873 A | 8/1994 | Merz et al. | |
| 5,344,208 A | 9/1994 | Bien et al. | |
| 5,382,606 A | 1/1995 | Butikofer | |
| 5,401,814 A | 3/1995 | Schomaker et al. | |
| 5,464,924 A | 11/1995 | Silvis et al. | |
| 5,470,886 A | 11/1995 | Makhlouf et al. | |
| 5,475,039 A | 12/1995 | Butikofer | |
| 5,506,025 A | 4/1996 | Otto et al. | |
| 5,575,526 A | 11/1996 | Wycech | |
| 5,593,759 A * | 1/1997 | Vargas | C09J 7/20 428/200 |
| 5,648,401 A | 7/1997 | Czaplicki et al. | |
| 5,649,400 A | 7/1997 | Norimichi | |
| 5,708,042 A | 1/1998 | Hasegawa | |
| 5,712,317 A | 1/1998 | Makhlouf et al. | |
| 5,725,272 A | 3/1998 | Jones | |
| 5,755,486 A | 5/1998 | Wycech | |
| 5,763,529 A | 6/1998 | Lucas | |
| 5,766,719 A | 6/1998 | Rimkus | |
| 5,783,272 A | 7/1998 | Wong | |
| 5,834,078 A | 11/1998 | Cavitt et al. | |
| 5,884,960 A | 3/1999 | Wycech | |
| 5,894,071 A | 4/1999 | Merz et al. | |
| 5,911,932 A | 6/1999 | Dyksterhouse | |
| 5,931,474 A | 8/1999 | Chang et al. | |
| 5,932,680 A | 8/1999 | Heider | |
| 5,948,508 A | 9/1999 | Pastore et al. | |
| 5,962,093 A | 10/1999 | White et al. | |
| 5,964,979 A | 10/1999 | George et al. | |
| 5,965,256 A | 10/1999 | Barrera | |
| 5,985,435 A | 11/1999 | Czaplicki et al. | |
| 5,994,422 A | 11/1999 | Born et al. | |
| 5,997,077 A | 12/1999 | Siebels et al. | |
| 6,004,425 A | 12/1999 | Born et al. | |
| 6,006,484 A | 12/1999 | Geissbuehler | |
| 6,030,701 A | 2/2000 | Johnson et al. | |
| 6,033,300 A | 3/2000 | Schneider | |
| 6,040,350 A | 3/2000 | Fukui | |
| 6,057,382 A | 5/2000 | Karim et al. | |
| 6,068,922 A | 5/2000 | Vercesi et al. | |
| 6,077,884 A | 6/2000 | Hess et al. | |
| 6,093,358 A | 7/2000 | Schiewe et al. | |
| 6,096,791 A | 8/2000 | Born et al. | |
| 6,103,341 A | 8/2000 | Barz et al. | |
| 6,103,784 A | 8/2000 | Hilborn et al. | |
| 6,111,015 A | 8/2000 | Eldin et al. | |
| 6,131,897 A | 10/2000 | Barz et al. | |
| 6,133,335 A | 10/2000 | Mahoney et al. | |
| 6,135,541 A | 10/2000 | Geise et al. | |
| 6,136,398 A | 10/2000 | Willett et al. | |
| 6,136,944 A | 10/2000 | Stewart et al. | |
| 6,146,565 A | 11/2000 | Keller | |
| 6,150,428 A | 11/2000 | Hanley et al. | |
| 6,153,302 A | 11/2000 | Karim et al. | |
| 6,162,504 A | 12/2000 | Hubert et al. | |
| 6,174,932 B1 | 1/2001 | Pachl et al. | |
| 6,180,715 B1 | 1/2001 | Schmidt | |
| 6,218,442 B1 | 4/2001 | Hilborn et al. | |
| 6,228,449 B1 | 5/2001 | Meyer | |
| 6,232,433 B1 | 5/2001 | Narayan | |
| 6,235,842 B1 | 5/2001 | Kuwano et al. | |
| 6,263,635 B1 | 7/2001 | Czaplicki | |
| 6,270,600 B1 | 8/2001 | Wycech | |
| 6,277,898 B1 | 8/2001 | Pachl et al. | |
| 6,281,260 B1 | 8/2001 | Hanley et al. | |
| 6,287,669 B1 | 9/2001 | George et al. | |
| 6,296,298 B1 | 10/2001 | Barz | |
| 6,303,672 B1 | 10/2001 | Papalos et al. | |
| 6,311,452 B1 | 11/2001 | Barz et al. | |
| 6,312,668 B2 | 11/2001 | Mitra et al. | |
| 6,319,964 B1 | 11/2001 | Blank et al. | |
| 6,348,513 B1 | 2/2002 | Hilborn et al. | |
| 6,350,791 B1 | 2/2002 | Feichtmeier et al. | |
| 6,358,584 B1 | 3/2002 | Czaplicki | |
| 6,368,438 B1 | 4/2002 | Chang et al. | |
| 6,376,564 B1 | 4/2002 | Harrison | |
| 6,382,635 B1 | 5/2002 | Fitzgerald | |
| 6,383,610 B1 | 5/2002 | Barz et al. | |
| 6,388,043 B1 | 5/2002 | Langer et al. | |

(56) References Cited

U.S. PATENT DOCUMENTS

| | | |
|---|---|---|
| 6,392,929 B1 | 5/2002 | Kim et al. |
| 6,403,222 B1 | 6/2002 | Harrison |
| 6,416,611 B1 | 7/2002 | Roberts et al. |
| 6,419,305 B1 | 7/2002 | Larsen |
| 6,429,244 B1 | 8/2002 | Rinka et al. |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,476 B1 | 9/2002 | Imai et al. |
| 6,455,634 B1 | 9/2002 | Khandpur et al. |
| 6,467,834 B1 | 10/2002 | Barz et al. |
| 6,471,285 B1 | 10/2002 | Czaplicki et al. |
| 6,479,560 B2 | 11/2002 | Freitag et al. |
| 6,482,486 B1 | 11/2002 | Czaplicki et al. |
| 6,486,256 B1 | 11/2002 | Tarbutton et al. |
| 6,489,400 B2 | 12/2002 | Khandpur et al. |
| 6,506,494 B2 | 1/2003 | Brandys et al. |
| 6,546,693 B2 | 4/2003 | Wycech |
| 6,548,593 B2 | 4/2003 | Merz et al. |
| 6,561,571 B1 | 5/2003 | Brennecke |
| 6,573,309 B1 | 6/2003 | Reitenbach et al. |
| 6,586,089 B2 | 7/2003 | Golden |
| 6,589,621 B1 | 7/2003 | Beckerdite et al. |
| 6,593,380 B2 | 7/2003 | Gehlsen et al. |
| 6,607,831 B2 | 8/2003 | Ho et al. |
| 6,617,366 B2 | 9/2003 | Sueda et al. |
| 6,620,501 B1 | 9/2003 | Kassa et al. |
| 6,634,698 B2 | 10/2003 | Kleino |
| 6,668,457 B1 | 12/2003 | Czaplicki |
| 6,682,818 B2 | 1/2004 | Czaplicki et al. |
| 6,692,347 B1 | 2/2004 | Schneider |
| 6,706,772 B2 | 3/2004 | Czaplicki et al. |
| 6,706,802 B2 | 3/2004 | Carlson et al. |
| 6,722,720 B2 | 4/2004 | Donick et al. |
| 6,730,713 B2 | 5/2004 | Czaplicki |
| 6,734,263 B2 | 5/2004 | Eadara et al. |
| 6,740,067 B2 | 5/2004 | Leise et al. |
| 6,740,379 B1 | 5/2004 | Congard et al. |
| 6,740,399 B1 | 5/2004 | George et al. |
| 6,753,379 B1 | 6/2004 | Kawate et al. |
| 6,774,171 B2 | 8/2004 | Kassa et al. |
| 6,776,869 B1 | 8/2004 | Schenkel |
| 6,777,079 B2 | 8/2004 | Zhou et al. |
| 6,787,065 B1 | 9/2004 | Schapira et al. |
| 6,787,579 B2 | 9/2004 | Czaplicki et al. |
| 6,787,593 B2 | 9/2004 | Bell et al. |
| 6,787,605 B2 | 9/2004 | Clough et al. |
| 6,787,606 B1 | 9/2004 | Chen |
| 6,790,597 B2 | 9/2004 | Dershem et al. |
| 6,790,906 B2 | 9/2004 | Chaignon et al. |
| 6,793,274 B2 | 9/2004 | Riley et al. |
| 6,797,371 B1 | 9/2004 | Gehlsen et al. |
| 6,800,157 B2 | 10/2004 | Tarbutton et al. |
| 6,800,680 B2 | 10/2004 | Stark et al. |
| 6,805,768 B2 | 10/2004 | Agarwal et al. |
| 6,806,320 B2 | 10/2004 | Everaerts et al. |
| 6,811,864 B2 | 11/2004 | Czaplicki et al. |
| 6,820,923 B1 | 11/2004 | Bock |
| 6,824,451 B2 | 11/2004 | Hollatz et al. |
| 6,838,509 B2 | 1/2005 | Shimo et al. |
| 6,846,559 B2 | 1/2005 | Czalicki et al. |
| 6,884,854 B2 | 4/2005 | Schoenfeld et al. |
| 6,887,914 B2 | 5/2005 | Czalicki et al. |
| 6,890,964 B2 | 5/2005 | Czaplicki et al. |
| 6,894,082 B2 | 5/2005 | Brantl et al. |
| 6,911,109 B2 | 6/2005 | Giroux et al. |
| 6,920,693 B2 | 7/2005 | Hankins et al. |
| 6,955,593 B2 | 10/2005 | Lewis et al. |
| 6,991,237 B2 | 1/2006 | Kassa et al. |
| 7,008,680 B2 | 3/2006 | Everaerts et al. |
| 7,025,409 B2 | 4/2006 | Riley et al. |
| 7,071,263 B2 | 7/2006 | Cheng et al. |
| 7,084,209 B2 | 8/2006 | Everaerts et al. |
| 7,084,210 B2 | 8/2006 | Eagle |
| 7,094,843 B2 | 8/2006 | Meyer |
| 7,114,763 B2 | 10/2006 | Riley et al. |
| 7,119,149 B2 | 10/2006 | Ferguson et al. |
| 7,125,461 B2 | 10/2006 | Czaplicki et al. |
| 7,169,467 B2 | 1/2007 | Wilson |
| 7,199,165 B2 | 4/2007 | Kassa et al. |
| 7,288,604 B2 | 10/2007 | Kuntimaddi et al. |
| 7,297,740 B2 | 11/2007 | Dyksterhouse |
| 7,392,929 B1 | 7/2008 | Finerman et al. |
| 7,438,782 B2 | 10/2008 | Sheasley et al. |
| 7,467,452 B2 | 12/2008 | Lande et al. |
| 7,494,179 B2 | 2/2009 | Deachin |
| 7,503,620 B2 | 3/2009 | Brennecke et al. |
| 7,735,906 B2 | 6/2010 | Takahashi et al. |
| 7,892,396 B2 | 2/2011 | Sheasley |
| 7,926,179 B2 | 4/2011 | Gray et al. |
| 8,105,460 B2 | 1/2012 | Sheasley |
| 8,163,116 B2 | 4/2012 | Riley |
| 2002/0013389 A1 | 1/2002 | Taylor et al. |
| 2002/0076566 A1* | 6/2002 | Brandys ............... C08G 59/188 428/458 |
| 2002/0123575 A1 | 9/2002 | Kato et al. |
| 2002/0164450 A1 | 11/2002 | Lupini et al. |
| 2002/0182955 A1 | 12/2002 | Weglewski et al. |
| 2002/0192387 A1 | 12/2002 | Agarwal et al. |
| 2003/0045620 A1 | 3/2003 | Carlson et al. |
| 2003/0050352 A1 | 3/2003 | Guenther et al. |
| 2003/0090129 A1 | 5/2003 | Riley et al. |
| 2003/0119987 A1 | 6/2003 | Eadara et al. |
| 2003/0144416 A1 | 7/2003 | Tarbutton et al. |
| 2003/0183317 A1 | 10/2003 | Czaplicki et al. |
| 2003/0186049 A1 | 10/2003 | Czaplicki et al. |
| 2004/0033324 A1 | 2/2004 | Meyer |
| 2004/0048078 A1 | 3/2004 | Czaplicki et al. |
| 2004/0076831 A1 | 4/2004 | Hable et al. |
| 2004/0079478 A1 | 4/2004 | Merz |
| 2004/0180193 A1 | 9/2004 | Oda et al. |
| 2004/0181013 A1 | 9/2004 | Schenkel |
| 2004/0191523 A1 | 9/2004 | Kye |
| 2004/0197545 A1 | 10/2004 | Gehlsen et al. |
| 2004/0204551 A1 | 10/2004 | Czaplicki et al. |
| 2004/0212220 A1 | 10/2004 | Riley et al. |
| 2004/0221953 A1 | 11/2004 | Czaplicki et al. |
| 2004/0229000 A1 | 11/2004 | Khandpur et al. |
| 2004/0266898 A1 | 12/2004 | Kassa et al. |
| 2004/0266899 A1 | 12/2004 | Muenz et al. |
| 2005/0016677 A1 | 1/2005 | Carlson et al. |
| 2005/0017543 A1 | 1/2005 | Riely et al. |
| 2005/0020703 A1 | 1/2005 | Czaplicki et al. |
| 2005/0081383 A1 | 4/2005 | Kosal et al. |
| 2005/0103422 A1 | 5/2005 | Kawaguchi |
| 2005/0119372 A1 | 6/2005 | Czaplicki et al. |
| 2005/0129895 A1 | 6/2005 | Nakamura |
| 2005/0154089 A1 | 7/2005 | Taylor et al. |
| 2005/0159511 A1 | 7/2005 | Kramer |
| 2005/0159531 A1 | 7/2005 | Ferng et al. |
| 2005/0172486 A1 | 8/2005 | Carlson et al. |
| 2005/0198907 A1 | 9/2005 | McKnight et al. |
| 2005/0221046 A1 | 10/2005 | Finerman et al. |
| 2005/0230027 A1 | 10/2005 | Kassa et al. |
| 2005/0241756 A1 | 11/2005 | Harthcock et al. |
| 2005/0279567 A1 | 12/2005 | Ito |
| 2006/0021697 A1 | 2/2006 | Riley |
| 2006/0057333 A1 | 3/2006 | Brahim |
| 2006/0090343 A1 | 5/2006 | Riley et al. |
| 2006/0155045 A1 | 7/2006 | Tsuno et al. |
| 2006/0171269 A1 | 8/2006 | Hiramatsu |
| 2006/0188726 A1 | 8/2006 | Muenz et al. |
| 2006/0252860 A1 | 11/2006 | Ui et al. |
| 2007/0045042 A1 | 3/2007 | Barz et al. |
| 2007/0087848 A1 | 4/2007 | Larsen et al. |

(56) References Cited

U.S. PATENT DOCUMENTS

| | | | |
|---|---|---|---|
| 2007/0088138 A1 | 4/2007 | Czaplicki et al. |
| 2007/0090360 A1 | 4/2007 | Dai et al. |
| 2007/0090560 A1 | 4/2007 | Kassa et al. |
| 2007/0095475 A1 | 5/2007 | Hable et al. |
| 2007/0101679 A1 | 5/2007 | Harthcock et al. |
| 2007/0116961 A1 | 5/2007 | Connell et al. |
| 2007/0117874 A1 | 5/2007 | Kassa et al. |
| 2007/0122510 A1 | 5/2007 | Mendiboure |
| 2007/0134058 A1 | 6/2007 | Meyer et al. |
| 2007/0138683 A1 | 6/2007 | Hideki et al. |
| 2007/0191556 A1 | 8/2007 | Eger |
| 2007/0264438 A1 | 11/2007 | Kawai |
| 2007/0281523 A1 | 12/2007 | Riley |
| 2007/0284036 A1 | 12/2007 | Sheasley |
| 2008/0014053 A1 | 1/2008 | Healy |
| 2008/0029200 A1 | 2/2008 | Sheasley |
| 2008/0060742 A1 | 3/2008 | Sheasley et al. |
| 2008/0105992 A1 | 5/2008 | Walker et al. |
| 2008/0241576 A1* | 10/2008 | Le Gall ............ B32B 5/18 428/621 |
| 2008/0257094 A1 | 10/2008 | Xie et al. |
| 2008/0257485 A1 | 10/2008 | Xie et al. |
| 2008/0262188 A1 | 10/2008 | Xie et al. |
| 2008/0269420 A1 | 10/2008 | Tong et al. |
| 2008/0299317 A1 | 12/2008 | Hable |
| 2008/0308212 A1 | 12/2008 | Sheasley et al. |
| 2008/0311405 A1 | 12/2008 | Wang et al. |
| 2009/0085379 A1 | 4/2009 | Takahashi et al. |
| 2009/0131557 A1 | 5/2009 | Uyama et al. |
| 2009/0269547 A1 | 10/2009 | Meyer et al. |
| 2009/0280330 A1 | 11/2009 | Xie et al. |
| 2010/0025147 A1 | 2/2010 | Kassa |
| 2011/0098382 A1* | 4/2011 | Czaplicki ............ C08G 59/186 523/453 |
| 2011/0215632 A1 | 9/2011 | Gleyal |
| 2012/0111488 A1 | 5/2012 | Sheasley et al. |
| 2012/0186721 A1 | 7/2012 | Preghenella |
| 2012/0205029 A1 | 8/2012 | Riley |
| 2013/0056153 A1 | 3/2013 | Czaplicki |
| 2013/0133771 A1 | 5/2013 | Richardson et al. |
| 2013/0206333 A1 | 8/2013 | Czaplicki |

FOREIGN PATENT DOCUMENTS

| | | |
|---|---|---|
| DE | 3639266 A1 | 11/1986 |
| DE | 3838655 A1 | 5/1990 |
| DE | 19919783 A1 | 11/2000 |
| EP | 0227002 A1 | 1/1987 |
| EP | 0360214 A2 | 3/1990 |
| EP | 0383498 A2 | 8/1990 |
| EP | 0432923 | 6/1991 |
| EP | 0442178 A1 | 8/1991 |
| EP | 0622833 A1 | 4/1994 |
| EP | 0710696 A2 | 5/1996 |
| EP | 0730999 A1 | 9/1996 |
| EP | 0819723 A1 | 1/1998 |
| EP | 0893332 A1 | 1/1999 |
| EP | 1022320 A1 | 7/2000 |
| EP | 1055699 A1 | 11/2000 |
| EP | 1072647 A2 | 1/2001 |
| EP | 1031496 B1 | 12/2001 |
| EP | 1182087 A2 | 2/2002 |
| EP | 0973840 B1 | 3/2003 |
| EP | 0703931 B1 | 10/2003 |
| EP | 1362683 A2 | 11/2003 |
| EP | 1240266 B1 | 2/2004 |
| EP | 0851894 B1 | 4/2004 |
| EP | 1272587 B1 | 5/2004 |
| EP | 1155084 B1 | 6/2004 |
| EP | 1431325 A1 | 6/2004 |
| EP | 1075498 B1 | 7/2004 |
| EP | 0820491 B1 | 8/2004 |
| EP | 0947529 B1 | 8/2004 |
| EP | 1185595 A2 | 8/2004 |
| EP | 1252217 B1 | 8/2004 |
| EP | 1449868 A1 | 8/2004 |
| EP | 1658319 B1 | 8/2004 |
| EP | 1023413 B1 | 9/2004 |
| EP | 1155082 B1 | 9/2004 |
| EP | 1305376 B1 | 9/2004 |
| EP | 1155053 B1 | 10/2004 |
| EP | 1163308 B1 | 10/2004 |
| EP | 1471105 A2 | 10/2004 |
| EP | 1001893 B1 | 11/2004 |
| EP | 1115770 B1 | 11/2004 |
| EP | 1187888 B1 | 11/2004 |
| EP | 1591224 A1 | 2/2005 |
| EP | 1574537 A1 | 9/2005 |
| EP | 1123348 B1 | 12/2005 |
| EP | 1602702 A1 | 12/2005 |
| EP | 1458594 B1 | 3/2006 |
| EP | 1666228 A2 | 6/2006 |
| EP | 1506265 B1 | 7/2006 |
| EP | 1578838 B1 | 8/2006 |
| EP | 1609831 B1 | 8/2006 |
| EP | 1453925 B1 | 10/2006 |
| EP | 1900787 | 3/2008 |
| EP | 2182025 A1 | 5/2010 |
| GB | 903146 A | 8/1962 |
| JP | S52-5056 B1 | 1/1977 |
| JP | 56-004432 A | 1/1981 |
| JP | 56/118816 A | 9/1981 |
| JP | 57-117542 A | 7/1982 |
| JP | 60-096681 A | 5/1985 |
| JP | 62-062882 A | 3/1987 |
| JP | 3/247446 A | 11/1991 |
| JP | 04-059819 A | 2/1992 |
| JP | 05-65391 | 3/1993 |
| JP | 06-166852 | 6/1994 |
| JP | 09-176616 A | 7/1997 |
| JP | 09-249730 A | 9/1997 |
| JP | 09-316169 A | 12/1997 |
| JP | 10-045031 A | 2/1998 |
| JP | 11-106544 A | 4/1999 |
| JP | 2001-62833 A | 3/2001 |
| JP | 2001191949 A | 7/2001 |
| JP | 2002-362412 A | 12/2002 |
| JP | 2004315688 A | 11/2004 |
| JP | 2005187508 A | 7/2005 |
| JP | 2006-520848 | 9/2014 |
| WO | 1994/029358 | 12/1994 |
| WO | 1995/033785 A1 | 12/1995 |
| WO | 1997/002967 A1 | 1/1997 |
| WO | 1997/011122 | 3/1997 |
| WO | 1997/012929 A1 | 4/1997 |
| WO | 1997/019124 A1 | 5/1997 |
| WO | 1998/036944 A1 | 8/1998 |
| WO | 1998/045382 | 10/1998 |
| WO | 1998/052997 A1 | 11/1998 |
| WO | 1998/053008 A1 | 11/1998 |
| WO | 1999/002578 A1 | 1/1999 |
| WO | 2000/002968 | 1/2000 |
| WO | 2000/003894 A1 | 1/2000 |
| WO | 2000/012571 A1 | 3/2000 |
| WO | 2000/012595 A1 | 3/2000 |
| WO | 2000/013876 A1 | 3/2000 |
| WO | 2000/020483 A2 | 4/2000 |
| WO | 2000/027920 A1 | 5/2000 |
| WO | 2000/037242 A1 | 6/2000 |
| WO | 2000/037554 A1 | 6/2000 |
| WO | 2000/039232 A1 | 7/2000 |
| WO | 2000/040629 A1 | 7/2000 |
| WO | 2000/052086 A2 | 9/2000 |
| WO | 2001/019667 A1 | 3/2001 |
| WO | 2001/057130 A1 | 8/2001 |
| WO | 2001/071225 A | 9/2001 |
| WO | 2001/088033 A | 11/2001 |
| WO | 2002/070620 A1 | 9/2002 |
| WO | 2002/088214 A1 | 11/2002 |
| WO | 2003/011954 A1 | 2/2003 |
| WO | 2003/040251 A1 | 5/2003 |
| WO | 2003/051676 A1 | 6/2003 |
| WO | 2003/054069 A1 | 7/2003 |

(56) References Cited

FOREIGN PATENT DOCUMENTS

| WO | 2003/058340 A1 | 7/2003 |
|---|---|---|
| WO | 2003/059997 A1 | 7/2003 |
| WO | 2003/072677 A1 | 9/2003 |
| WO | 2003/078163 A1 | 9/2003 |
| WO | 2003/095575 A1 | 11/2003 |
| WO | 2004/050740 A1 | 6/2004 |
| WO | 2004/055092 A1 | 7/2004 |
| WO | 2004/060956 A1 | 7/2004 |
| WO | 2004/060984 A1 | 7/2004 |
| WO | 2004/062869 A2 | 7/2004 |
| WO | 2004/065485 A1 | 8/2004 |
| WO | 2004/076507 A2 | 9/2004 |
| WO | 2004/078853 A2 | 9/2004 |
| WO | 2004/085510 A1 | 10/2004 |
| WO | 2004/085564 A1 | 10/2004 |
| WO | 2004/099312 A1 | 11/2004 |
| WO | 2005/002950 A2 | 1/2005 |
| WO | 2005/007720 A1 | 1/2005 |
| WO | 2005/019285 A1 | 3/2005 |
| WO | 2005/044630 A1 | 5/2005 |
| WO | 2005/047393 A1 | 5/2005 |
| WO | 2005/090431 A1 | 9/2005 |
| WO | 2005/090455 A1 | 9/2005 |
| WO | 2005/095484 A1 | 10/2005 |
| WO | 2005/105405 A1 | 11/2005 |
| WO | 2005/108456 A1 | 11/2005 |
| WO | 2005/113627 A1 | 12/2005 |
| WO | 2006/074394 A2 | 7/2006 |
| WO | 2006/128722 | 12/2006 |
| WO | 2006/131190 A1 | 12/2006 |
| WO | 2007/025007 | 3/2007 |
| WO | 2007/050658 A1 | 5/2007 |
| WO | 2008/014053 A2 | 1/2008 |
| WO | 2008/157129 A1 | 12/2008 |
| WO | 2009/016106 A1 | 2/2009 |
| WO | 2009/098141 A1 | 8/2009 |
| WO | 2009/124709 A1 | 10/2009 |
| WO | 2010/000371 | 1/2010 |
| WO | 2010/011705 A1 | 1/2010 |
| WO | 2011/012997 A2 | 2/2011 |
| WO | 2011/025873 A1 | 3/2011 |
| WO | 2011/109699 A1 | 9/2011 |
| WO | 2011/117398 A1 | 9/2011 |
| WO | 2011/117402 A1 | 9/2011 |
| WO | 2012/110230 A1 | 8/2012 |
| WO | 2013/068819 A2 | 5/2013 |

OTHER PUBLICATIONS

International Search Report dated Jul. 14, 2009; for Corresponding PCT Application No. PCT/EP2009/002546 filed Apr. 7, 2009.
Corresponding PCT Application No. PCT/EP2009/002546 filed Apr. 7, 2009; Published as WO 2009/124709 A1 on Oct. 15, 2009.
Search Report dated Oct. 15, 2008; for Corresponding Application No. GB0806434.7 filed Apr. 9, 2008.
Corresponding No. GB0806434.7 filed Apr. 9, 2008; Published as WO 2009/124709 A1 on Oct. 15, 2009.
*The Epoxy Book* Published by System Three Resins, Inc. Seattle, Washington (2000).
"Epoxy Resins" Second Edition Encyclopedia of Polymer Science and Engineering, vol. 6, pp. 322-382 (1985).
Born et al. "Structural Bonding in Automotive Applications" (Apr. 2004).
Dvorko. "One-Part Epoxy Compounds and Derived Foam Plastics", published Apr. 13, 2004.
Zalobsky et al., "Recommendations on Selection and Use of Cavity Reinforcement Materials" Proceedings of the 1999 Noise and Vibration Conference.
Weber et al., "Characterizing the In Vehicle Performance of Expandable Sealants Used as Acoustic Baffles", Proceedings of the 1999 Noise and Vibrations Conference.
Weber et al., "Requirements for Improved Performance of Specialty Sealing and Bonding Materials for Automotive Applications", SAE 2000 World Congress, Mar. 6-9, 2000.
Liu et al., "Validation of Epoxy Foam for Structural and Crash Application". 2004 SAE World Congress, Mar. 8-11, 2004.
Schulenburg et al., "Structural Adhesives—Improvements in Vehicle Crash Performance", 2004 SAE World Congress, Mar. 8-11, 2004.
Casey et al., "Expandable Epoxy Foam: A Systematic Approach to Improve Vehicle Performance", 2004 SAE World Congress, Mar. 8-11, 2004.
Lilley et al., Vehicle Acoustic Solutions. (May 5-8, 2003).
Related U.S. Appl. No. 11/188,679, filed Jul. 25, 2005; Issued as U.S. Pat. No. 6,392,929 on Jul. 1, 2008.
Related U.S. Appl. No. 11/189,190, filed Jul. 26, 2005; Published as US 2006/0021697 A1 on Feb. 2, 2006.
Related U.S. Appl. No. 11/254,129, filed Oct. 19, 2005; Published as US 2006/0090343 A1 on May 4, 2006.
Related U.S. Appl. No. 11/339,431, filed Jan. 25, 2006; Issued as U.S. Pat. No. 7,467,452 on Dec. 23, 2008.
Related U.S. Appl. No. 11/390,658, filed Mar. 28, 2006; Issued as U.S. Pat. No. 7,494,179 on Feb. 24, 2009.
Related U.S. Appl. No. 11/391,884, filed Mar. 29, 2006; Published as US 2007-0122510 A1 on May 31, 2007.
Related U.S. Appl. No. 11/339,535, filed Mar. 30, 2006; Published as US 2006-0171269 A1 on Aug. 3, 2006.
Related U.S. Appl. No. 11/393,431, filed Mar. 30, 2006; Published as US 2007-0134058 A1 on Jun. 14, 2007.
Related U.S. Appl. No. 11/401,207, filed Apr. 10, 2006; Published as US 2007-0087848 A1 on Apr. 19, 2007.
Related U.S. Appl. No. 11/381,769, filed May 5, 2006; Issued as U.S. Pat. No. 7,503,620 on Mar. 17, 2009.
Related U.S. Appl. No. 11/422,705, filed Jun. 7, 2006; Issued as U.S. Pat. No. 7,438,782 on Oct. 21, 2008.
Related Patent U.S. Appl. No. 10/597,610, filed Aug. 1, 2006; Published as US 2008-0241576 A1 on Oct. 2, 2008.
Related U.S. Appl. No. 11/461,557, filed Aug. 1, 2006; Issued as U.S. Pat. No. 7,926,179 on Apr. 19, 2011.
Related U.S. Appl. No. 11/467,185, filed Aug. 10, 2006; Published as US 2007-0045042 A1 on Mar. 1, 2007.
Related U.S. Appl. No. 10/867,835, filed Jun. 15, 2004; Issued as U.S. Pat. No. 7,199,165 on Apr. 3, 2007.
Related Patent Application No. PCT/US04/20112, filed Jun. 23, 2004; Published as WO 2005/002950 on Jan. 13, 2005.
Related Patent Application No. US 2011/027166 filed Mar. 4, 2011; Published as WO 2011/109699 on Sep. 9, 2011.
Related U.S. Appl. No. 13/387,192, filed Apr. 4, 2012; Published as US 2012-0186721 A1 on Jul. 26, 2012.
Related U.S. Appl. No. 11/551,035, filed Oct. 19, 2006; Published as US 2007-0090560 A1 on Apr. 26, 2007.
Korean Office Action dated Aug. 20, 2015; Application No. 10-2010-7025154.
European Office Action dated Sep. 24, 2014 for Application No. 09729501.8.
European Office Action dated Oct. 4, 2012 for Application No. 09729501.8.
Japanese Office Action dated Jul. 23, 2014; Application No. 2011-503370.
Notice of Opposition dated Apr. 23, 2015; European Patent No. EP2553034.
Opposition dated Apr. 23, 2015; European Patent No. 2553034.
Notice of Opposition dated Mar. 31, 2015; European Patent No. EP2553035.
Opposition dated Apr. 9, 2015; European Patent No. EP2553035.
Mechanical Properties of Epoxy—Polyurethane Polymer Blends Dated Dec. 3, 2006; Kh.R.Al Rawi; Um-Salama Science Journal; vol. 3.
Shape Memory Epoxy: A Systematic Study of their Performance; 2009; Ingrid A. Rousseau; vol. 7289.
Army Research Laboratory; Interpenetrating Polymer Network (IPN) Adhesives for Electron Beam Cure; James M. Sands; Sep. 2000.
Synthesis and Properties of Polyurethane Acrylate/Epoxy Resin Interpenetrating Polymer Networks; Chinese Journal of Polymer Science; vol. 6, No. 3; 1988.

(56) References Cited

OTHER PUBLICATIONS

R.E. Touhsaent, D.A. Thomas, and L.H. Sperling: "Epoxy/Acrylic Simultaneous Interpenetrating Networks" J. Polymer Sci.: Symposium, Nr. 46, 1974, Seiten 175-190.
International Preliminary Report on Patentability dated Oct. 2, 2012; Application No. PCT/EP2011/054642.
International Search Report dated May 30, 2011; Application No. PCT/EP2011/054642.
International Preliminary Report on Patentability dated Oct. 15, 2015; Application No. PCT/EP2011/054647.
International Search Report dated May 30, 2011; Application No. PCT/EP2011/054647.
PCT International Preliminary Report on Patentability dated Feb. 7, 2013; Application No. PCT/EP2011/003736.
PCT International Search Report & the Written Opinion dated Jun. 6, 2012; Application No. PCT/EP2011/003736.
European Communication dated Mar. 12, 2013; Application No. 11746457.8-1302.
Chinese Office Action dated Jan. 12, 2015; Application No. 201180029998.2.
Copending U.S. Appl. No. 12/936,777, filed Dec. 3, 2010 (Published as WO2009124709).
Copending U.S. Appl. No. 12/136,333, filed Jun. 10, 2008.
International Preliminary Report on Patentability dated Nov. 22, 2012 for PCT/EP2011/002293.
International Search Report & Written Opinion dated Jun. 6, 2012 for PCT/EP2011/002293.
UK Search Report dated May 6, 2011 for Application No. GB1007793.1.
International Preliminary Report on Patentability for PCT/US2008/066413, dated Mar. 19, 2010.
Chinese Office Action dated Feb. 9, 2018, Application No. 201480052851.9.
Chinese Decision of Rejection dated Feb. 11, 2019, Application No. 201480052851.9.
Chinese Decision of Rejection dated Jan. 31, 2019, Application No. 201480052850.4.
PCT Written Opinion of the International Searching Authority dated Nov. 21, 2014 (Appln. No. PCT/IB2014/063427).
European First Communication dated Oct. 30, 2019, Application No. 14750801.4.
India Examination Report dated Dec. 23, 2019, Application No. 201637002780.
India Examination Report dated Dec. 18, 2019, Application No. 201637002781.

* cited by examiner

RELATING TO THERMOSETTING ADHESIVE FILMS

The present invention relates to adhesive films and in one embodiment to adhesive films that are non-tacky to the touch at room temperature. Additionally the films are storage stable at room temperature and can be heat activated to produce a strong bond between two substrates. The adhesive films are particularly useful in the production of an adhesive bond between two dissimilar substrates and/or in the bonding to oily surfaces which traditionally have been difficult to bond to.

The adhesive films when cured should not be brittle and should provide fracture toughness which means that a flaw in the film is protected against propagation and it is also desirable that the cured films have an elongation to break to allow them to help absorb impact. Thermosetting adhesive compositions are well known and many are based on epoxy resins and various methods have been proposed to improve the toughness of the adhesive bond formed and to control the glass transition temperature and accordingly reduce the brittleness of the cured adhesive. The adhesives are often used in highly automated processes such as in the production of components for automobiles, aerospace vehicles such as aircraft and rockets and in the construction and furniture industries. One desirable property is that the adhesive can be cured over a relatively short period of time and at temperatures conventionally used in the production of such components. In this way the curing of the adhesive will not unduly delay the component production process.

It has also been proposed that the adhesives may be in the form of films. The known films based on epoxy resins that can be used as an adhesive do not have the combined properties of being non-tacky to the touch at room temperature and storage stable at room temperature being flexible and protected against the propagation of flaws. Additionally, some have an unpleasant odour and do not have the requisite cure time and cure temperature.

Additionally, it is desirable that the adhesives can be applied and cured in any location. Prior thermosetting adhesives tend to be thin liquids during the curing process which means they can flow during cure if used in a vertical or inclined position and may not remain in the desired location. For example when used to bond vertical or inclined surfaces. Accordingly on one embodiment the invention provides a thermosetting curable adhesive which has thixotropic properties during the curing of the adhesive at the preferred curing temperature.

To be non-tacky to the touch at room temperature is beneficial in that the films may be reeled and unreeled without sticking to each other. Within this patent application a film is considered to be non-tacky to the touch if it does not need a force more than 2 N to pull out a 25 mm diameter stainless steel plate applied on its surface. Although in certain instances it may be useful for the film to have a tacky surface.

Storage stability at room temperature is also important in that if the film is storage stable at room temperature it is not necessary to provide costly refrigeration facilities for storage and transport of the film. By storage stable at room temperature we mean that the uncured adhesive does not lose more than 10%, preferably not more than 5%, of its mechanical performances after three months of storage at room temperature (23° C.). Many earlier films need to be stored at 0° C. or below. The films of this invention can therefore be stored, transported and cut at ambient temperature. Additionally if they are used with a release liner, the liner can be easily removed at room temperature.

It is also desirable that the films can be produced by extrusion.

Another important quality of the film is that it can be cured to adhere to oily surfaces such as metals with oil on their surfaces. The film is considered to adhere to oily surfaces if upon curing the film will adhere to a metal surface provided with a layer of 3 g/m2 of corrosion preventive oil like Anticorit® and Ferrocoat®. The shear strength of this assembly should not be reduced by more than 15%, preferably no more than 10%, of the shear strength of a similar assemblies made without the oil.

A difficulty when thermosetting adhesive films are used to bond dissimilar substrates is that the substrates may have different coefficients of thermal expansion and accordingly the surfaces of the substrates may move relative to each other, albeit by small amounts, during the heating to cure the adhesive. Hereagain a short cure time of the adhesive and a low coefficient of thermal expansion are beneficial in that it reduces the time available for thermal expansion of the substrates and thus reduces the relative positional changes of the substrates. Additionally the thermosetting adhesive film should have sufficient flexibility during the cure process to allow for a degree of movement between the substrates.

The invention provides an adhesive film which satisfies these requirements and which has an overall desirable combination of properties.

The invention therefore seeks to provide a thermosetting adhesive film which is
i) preferably non-tacky to the touch at room temperature
ii) is flexible prior to cure
iii) is storage stable at room temperature
iv) can be cured in no more than 45 minutes preferably 15 minutes at a temperature no higher than 220° C. preferably no higher than 190° C. preferably 130° C. to 190° C.
v) preferably forms an adhesive bond with oily surfaces
vi) has enhanced protection against the propagation of flaws and
vii) preferably is thixotropic during the heat curing of the adhesive film especially in the temperature range 130° C. to 220° C.

There may be prior films that have one or more comparable properties but the films of this invention provide improved combined overall properties.

In a preferred embodiment the adhesive film is epoxy resin based.

Additionally we have found that through use of a preferred formulation to produce the films of this invention films having improved uniformity of thickness can be obtained which allows more precise predictions and control of the properties of the final bond.

It is preferred that the film be produced by extrusion.

The films may be foamable and they preferably have the following properties. An unfoamed film Density (uncured): 1.1 to 1.5 preferably 1,3±0.1 kg/dm3
Thickness (uncured): 0.3 to 2 mm
Cure Temperature: 130° C. to 210° C. preferably 130° C. to 190° C.
Expansion during curing: <5%
Typical Lap Shear Resistance: >30 MPa
Cure Conditions: 30 min at 165° C.
Samples: 1.8 mm G10/10 HD galvanized steel, 0.3 mm bondline, 25×12.5 mm overlap
Test Speed: 10 mm/min
Average T Peel resistance greater than 7 Nmn Young Modulus: >2200 MPa
Elongation to break: 1 to 4%
Storage stability at room temperature at least 3 months
Good adhesion to oily surfaces, as shown by loses of less than 20% of its mechanical properties when compared to adhesion to a non-oily surface.
A foamed film
Density (uncured): 1.1 to 1.5 preferably 1.3±0.1 kg/dm3
Thickness (uncured): 0.3 to 2 mm
Cure Temperature: 130° C. to 210° C. preferably 130° C. to 190° C.
Expansion During Curing: 5 to 140% preferably 50% for 2 mm film thickness (increase slightly with thickness)
Typical Lap Shear Resistance: >20 MPa
Cure Conditions: 30 min at 165° C.
Samples: 1.8 mm G10/10 HD galvanized steel, 0.3 mm bondline, 25×12.5 mm overlap
Test Speed: 10 mm/min
Average T Peel resistance greater than 7 Nmn
Young Modulus: >750 MPa
Elongation to break: 12 to 20%
Storage stability at room temperature at least 3 months
Good adhesion to oily surfaces, as shown by loses of less than 20% of its mechanical properties when compared to adhesion to a non-oily surface.
T Peel resistance is measured according to NFEN ISO 113394 with a substrate of 0.7 mm G 10/10 galvanised steel and a bond line of 25×100×0.3 mm.

The adhesive film preferably has an uncured thickness between 0.2 and 3.0 mm.

PCT Publication WO 2011/025873 relates to thermosetting adhesive compositions which can be provided as films. However, the thermosetting materials are pre-reacted which means that the films will not have the desired flexibility prior to exposure in the thermosetting environment and are difficult to employ in irregular shaped environments. Additionally the adhesive film cannot be produced by extrusion and the adhesives of WO 2011/025873 are shown to have an undesirably long cure time of about 90 minutes at 165° C. The films also have poor storage stability at room temperature and need to be stored under refrigerated conditions The formulations employed to produce the adhesive films of the present invention will depend upon the use to which the adhesive film is to be put.

A preferred formulation from which the adhesive film of the invention may be produced comprises
i) a phenoxy resin
ii) an elastomer/epoxy resin adduct
iii) a core shell material and
iv) a curing agent
preferably the formulation additionally contains an epoxy resin.

It is important that the films of this invention are not brittle and also that they have fracture toughness which is the ability to resist propagation of a flaw once one exists within the film. We have found that the use of a phenoxy resin improves the flexibility of the film and reduces the brittleness compared to films based solely upon epoxy resins. We have also found that the use of the elastomer epoxy adduct and the core/shell material provide fracture toughness as well as contributing to the flexibility of the film.

We prefer to use a formulation that contains at least 15 wt % of a phenoxy resin, preferably from 15 to 40 wt % of a phenoxy resin. We prefer that the formulation contain at least 5 wt % of an elastomer epoxy resin adduct preferably from 5 to 40 wt %. Additionally the preferred formulation contains at least 5 wt % of a core shell polymer, preferably from 5 to 25 wt %. The percentages being of the entire formulation including other ingredients that may be present.

The phenoxy resins are high molecular weight materials which typically have a melting point around 150° C. or higher. As one important use of the films of this invention is in the production of adhesive bonds by the curing of the films at temperatures experienced in the automobile e-coat process, it is preferred to formulate the formulation from which the film is made at temperatures below the melting point of the phenoxy resin. Accordingly it is preferred that the phenoxy resin be provided to the formulating activity as a solution. We have found that a liquid epoxy resin is a particularly good solvent for the phenoxy resin.

Preferred phenoxy resins are high molecular weight thermoplastic condensation products of bisphenol A and epichlorohydrin and their derivatives. Typically the phenoxy resins that may be employed are of the formula where n is typically from 30 to 100 preferably from 50 to 90. Modified phenoxy resins may also be used. Examples of phenoxy resins that may be used are the products marketed by Inchem Corp. Examples of suitable materials are the PKHB, PKHC, PKHH, PKHJ, PKHP-pellets and powder. Alternatively phenoxy/polyester hybrids and epoxy/phenoxy hybrids may be used. In order to enhance the production of the structural adhesive the phenoxy resin may be supplied to the other components as a solution. While any solvent may be used it is particularly preferred to use a liquid epoxy resin as the solvent as this can also contribute to the adhesive properties upon activation.

Typical other ingredients which may be used in the formulation include epoxy resins, hardeners (curing agents) for the epoxy resins, toughners for the epoxy resin system and flexibilizers. The films are preferably produced by extrusion and it is therefore preferred to include a reactive diluent in the formulation which aids extrusion and increases the flexibility of the uncured adhesive film, the use of a reactive diluent can also enable extrusion of the adhesive composition to form the film and can increase the ability of the adhesive formulation to impregnate fibrous layers which may be used as a support for the adhesive film as is discussed later. Mono-functional epoxy resins are particularly useful as reactive diluents.

In one embodiment the invention therefore provides the use of reactive diluent such as a mono-functional epoxy resin in a thermosetting adhesive film to increase the flexibility of the uncured adhesive film.

The thermosetting adhesive films of this invention may contain epoxy resins and may contain other components according to the adhesive performance that is required.

Examples of other components which may be included in the formulations from which the films are made are
i. rubbers and elastomers optionally modified with epoxy resins to provide increased toughness to the cured adhesive, preferably including a core shell rubber material
ii. curing agents for epoxy resins optionally together with curing agent accelerators
iii. optionally foaming agents if the adhesive is required to be a foamable material.

The preferred thermosetting adhesive compositions therefore contain a phenoxy resin, an epoxy resin in combination with elastomers and/or thermoplastics which are preferably core-shell particles and can be thermally cured with curing agents such as amine curing agents to provide thermosetting adhesive compositions having high toughness and high temperature shear properties upon cure combined with a non-tacky surface at room temperature and good storage stability at room temperature. In addition to the unexpected increase in higher temperature properties with improved toughness, these cured films are also characterized by high glass transition temperatures, high Youngs modulus, a desirable elongation to break and low water absorption making these compositions suitable for demanding environments that require high performance, such as for the aerospace and automotive industries.

Core-Shell Particles

Particles having a core-shell structure are a preferred component of the compositions used to produce the films of the present invention. Such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than room temperatures, e.g., greater than about 50° C.). For example, the core may be comprised of, for example, a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth) acrylamides, and the like having a suitably high glass transition temperature. The polymer or copolymer used in the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. Other elastomeric polymers may also be suitably be used for the core, including polybutylacrylate or polysiloxane elastomer (e.g., polydimethylsiloxane, particularly crosslinked polydimethylsiloxane). The particle may be comprised of more than two layers (e.g., a central core of one elastomeric material may be surrounded by a second core of a different elastomeric material or the core may be surrounded by two shells of different composition or the particle may have the structure soft core, hard shell, soft shell, hard shell). Either the core or the shell or both the core and the shell may be crosslinked (e.g., ionically or covalently), as described, for example, in U.S. Pat. No. 5,686,509. The shell may be grafted onto the core. The polymer comprising the shell may bear one or more different types of functional groups (e.g., epoxy groups, carboxylic acid groups) that are capable of interacting with other components of the compositions of the present invention. In other embodiments, though, the shell is free of functional groups capable of reacting with other components present in the composition. Typically, the core will comprise from about 50 to about 95 percent by weight of the particles while the shell will comprise from about 5 to about 50 percent by weight of the particles.

Preferably, the elastomeric particles are relatively small in size. For example, the average particle size may be from about 30 nm to about 120 nm. In certain embodiments of the invention, the particles have an average diameter of less than about 80 nm. In other embodiments, the average particle size is less than about 100 nm. For example, the core-shell particles may have an average diameter within the range of from 50 to about 100 nm.

Elastomeric particles having a core-shell structure are available from several commercial sources. The following core-shell particles are suitable for use in the present invention, for example: the core-shell particles available in powder form from Wacker Chemie under the tradename GENIOPERL, including GENIOPERL P22, P23, P52 and P53, which are described by the supplier as having crosslinked polysiloxane cores, epoxy-functionalized polymethylmethacrylate shells, polysiloxane content of about 65 weight percent, softening points as measured by DSC/DMTA of about 120° C., and a primary particle size of about 100 nm, the core-shell rubber particles available from Dow under the tradename PARALOID, in particular the PARALOID EXL 2600/3600 series of products, which are grafted polymers containing a polybutadiene core upon which is grafted a styrene/methylmethacrylate copolymer and having an average particle size of ca. 0.1 to about 0.3 microns; the core-shell rubber particles sold under the tradename DEGALAN by Evonik Röhm GmbH or Röhm America, Inc. (e.g., DEGALAN 4899F, which is reported to have a glass transition temperature of about 95° C.); the core-shell rubber particles sold by Nippon Zeon under the tradename F351; and the core-shell rubber particles sold by Galata Chemicals under the tradename BLENDEX.

Elastomeric particles having a core-shell structure may be prepared as a masterbatch where the particles are dispersed in one or more epoxy resins such as a diglycidyl ether of bisphenol A. For example, the particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in European Patent Application EP 1632533. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch. Other methods for preparing masterbatches of elastomeric particles having a core-shell structure stably dispersed in an epoxy resin matrix are described in U.S. Pat. Nos. 4,778,851 and 6,111,015. Preferably, the particles are stably dispersed in the epoxy resin matrix, i.e., the core-shell particles remain as separated individual particles with little or no agglomeration of the particles or precipitation (settling) of the particles from the masterbatch as the masterbatch is aged by standing at room temperature. The shell of the elastomeric particles may advantageously be functionalized to improve the stability of the masterbatch, although in another embodiment the shell is non-functionalized (i.e., does not contain any functional groups that react with any of the other components of the adhesive composition (such as the epoxy resin or curing agent) when that composition is cured). Particularly suitable dispersions of particles having a core-shell structure in an epoxy resin matrix are available from Kaneka Corporation, and include, for example, KANE ACE MX 120®.

Assuming that the total amount of the epoxy resin and rubber particles in a masterbatch is 100% by weight, the content of the core-shell particles may be, for example, 0.5 to 80% by weight, preferably 1 to 70% by weight, more preferably 3 to 60% by weight, still more preferably 20 to 40% by weight. In one embodiment, the weight percentage of the epoxy resin containing, or predispersed with, nano core-shell particles is from 40% to 50% of the total weight of the composition.

The use of these core shell rubbers provides toughness to the cured adhesive film, irrespective of the temperature or temperatures used to cure the formulation. Many of the core-shell rubber structures available from Kaneka in the form of phase separated particles dispersed in epoxy resin are believed to have a core made from a copolymer of (meth)acrylate-butadiene-styrene, where butadiene is the primary component of the copolymer in the core. Other commercially available masterbatches of core-shell rubber particles dispersed in epoxy resins include GENIOPERL M23A (a dispersion of 30 wt % core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted; the silicone elastomer core represents about 65 wt % of the core-shell particle), available from Wacker Chemie GmbH.

Typically, the composition from which the films are made may contain from 5 to 30 wt %, preferably 5 to 25 wt %, more preferably from 8 to 20 wt %, elastomeric particles having a core-shell structure. Combinations of different core-shell particles may advantageously be used in the present invention. The core-shell particles may differ, for example, in particle size, the glass transition temperatures of their respective cores and/or shells, the compositions of the polymers used in their respective cores and/or shells, the functionalization of their respective shells, and so forth.

Toughening Agents

Toughening agents are preferably included in the compositions used to prepare the films of this invention. Suitable toughening agents may be selected from a wide variety of substances, but generally speaking such materials are polymeric or oligomeric in character, and may have functional groups such as epoxy groups, carboxylic acid groups, amino groups and/or hydroxyl groups capable of reacting with the other components of the compositions, the composition is cured by heating.

The epoxy-based prepolymers obtained by reacting one or more amine-terminated polymers such as amine-terminated polyethers and amino silane-terminated polymers with one or more epoxy resins represent a particularly preferred class of toughening agents. The epoxy resins useful for such purpose may be selected from among the epoxy resins described hereinabove, with particular preference being given to the diglycidyl ethers of polyphenols such as bisphenol A and bisphenol F (for example, having epoxy equivalent weights of from about 150 to about 1000). Mixtures of solid and liquid epoxy resins may be suitably employed.

The preparation of such epoxy-based prepolymers from amine-terminated polyethers is well known in the art and is described, for example, in U.S. Pat. Nos. 5,084,532 and 6,015,865. Generally speaking, it will often be desirable to adjust the ratio of amine-terminated polyetherepoxy resin being reacted such that there is an excess of epoxy groups relative to amine groups such that the latter functional groups are completely reacted (i.e., the epoxy-based prepolymer contains essentially no free amine groups). Mixtures of di- and trifunctional amine-terminated polyethers may be used. Amine-terminated polyethers containing both oxyethylene and oxypropylene repeating units (e.g., copolymers of ethylene oxide and propylene oxide, with the copolymers having a block, capped or random structure) may also be utilized as the amino-terminated polyether. Preferably, the amino-terminated polyether contains at least two amine groups per molecule. Preferably, the amine groups are primary amine groups.

When reacting the epoxy resins with the amine-terminated polyether, an excess of epoxy groups over the amino groups is preferably used so that the latter react completely with epoxide groups. Typically, there is a 1.5 to 10-fold excess, for example a 3.5-fold excess of epoxy groups over the active hydrogen equivalents (AHEW) of the amine-terminated polyether. In preparing the composition according to the present invention, the epoxy-based prepolymer component preferably is initially prepared in a first stage. To this end, preferably, the epoxy resins are reacted with the amine-terminated polyether in the desired ratio. The reaction preferably is carried out at high temperature, preferably at 90° to 130° C., for example at approximately 120° C., for a duration of, e.g., three hours.

Other suitable toughening agents include amorphous polysulfones, i.e., those polymers that contain predominately ether and sulfone groups interspersed between arylene residues. Such polysulfones, sometimes called polyethersulfones, may be prepared by the processes taught in U.S. Pat. No. 4,175,175, and particularly U.S. Pat. No. 3,647,751, for example.

Polysulfones containing ether and alkylene groups in addition to sulfone groups are predominately amorphous, and are suitable candidates for the practice of the subject invention. Such polysulfones (polyethersulfones) have glass transition temperatures Tg, of greater than 150° C., preferably greater than 175° C., and most preferably in excess of 190° C. The Tg of a preferred KM 180 amine terminated polyether sulfone (manufactured by Cytec Industries Inc., Woodland Park N.J.) is approximately 200° C.

Other toughners or impact modifiers known in the epoxy adhesive art may be used in addition to the aforementioned prereacts derived by reaction of amine-terminated polymers or amino silane-terminated polymers with epoxy resins. Generally speaking, such toughners and impact modifiers are characterized by having glass transition temperatures ranging from −30° C. to 300° C. Examples of such toughners and impact modifiers include, but are not limited to: reaction products of epoxy-reactive copolymers of butadiene (especially epoxy-reactive copolymers of butadiene with relatively polar comonomers such as (meth)acrylonitrile, (meth)acrylic acid, or alkyl acrylates, e.g., carboxyl-terminated butadiene-nitrile rubbers. Other examples include polyimides such as Matrimid 9725 supplied by Huntsman, Polyetherimides such as Ultem supplied by Sabic and others.

Mixtures of different auxiliary impact modifiers/toughening agents may be used. The amount of auxiliary impact modifier/toughening agent in the curable compositions of the present invention may vary substantially but typically is from about 0.1 to about 20 wt %, e.g. from about 5 to about 15 wt %. In one embodiment, it is contemplated that the toughening agent is present from about 10% to about 15% by weight of the total.

In another embodiment, the thermosetting adhesive compositions include a toughening agent chosen from carboxy-terminated acrylonitrile-butadiene copolymer, polyamides, polyimides, and amido-amides. The carboxy-terminated acrylonitrile-butadiene copolymer can include, for example, NIPOL 1472 from Zeon, whereas the polyamide can include, for example, polyamide. Suitable polyimides are known to those of ordinary skill in the art and include, for example, those described in detail in U.S. Pat. No. 5,605,745. Particularly preferred are those polyimides which, because of the asymmetry of the dianhydride or diamine, particularly the latter, possess a lesser degree of crystallinity or are wholly amorphous. Polyimides based on BTDA and AATI are preferred. Such polyimides are available commercially under the trademark MATRIMID® 5218 from Huntsman and have an inherent viscosity of >0.62 dl/g when measured at 0.5 wt % concentration in N-methylpyrollidone at 25° C. The molecular weight of these most preferred polyimides is greater than 20,000 Daltons, preferably greater than 50,000 Daltons, and most preferably in the range of about 100,000 Daltons.

Epoxy Elastomer Adduct

An epoxy elastomer adduct is preferably included in the formulation to import flexibility to the structural adhesive film and also enhance the ability to initiate plastic deformation. Various epoxy/elastomer adducts may be employed. The epoxy/elastomer hybrid or adduct may be included in an amount of up to about 50% by weight of the structural adhesive. The epoxy elastomer adduct is approximately at least 5%, more typically at least 7% and even more typically at least 10% by weight of the formulation and more preferably about 12% to 40% by weight of the adduct based on the structural adhesive. The elastomer-containing adduct may be a combination of two or more particular adducts and the adducts may be solid adducts, semi-solids, at a temperature of 23° C. or may also be combinations thereof. A solid adduct is preferred in one preferred embodiment the adduct is composed of substantially entirely (i.e., at least 70%, 80%, 90% or more) of one or more adducts that are solid at a temperature of 23° C. We have found unexpectedly that when the adduct is used in the films of this invention together with a core/shell polymer desirable adhesive performance can be achieved over a wide range of temperatures the adduct imparts high temperature stability to the adhesive since there is little undesirable lowering of the Tg of the cured adhesive.

The adduct itself generally includes about 1:5 to 5:1 parts of epoxy to elastomer, and more preferably about 1:3 to 3:1 parts of epoxy to elastomer. More typically, the adduct includes at least about 10%, more typically at least about 20% and even more typically at least about 40% elastomer and also typically includes not greater than about 60%, although higher or lower percentages are possible. The elastomer compound suitable for the adduct may be a thermosetting elastomer, although not required. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. Examples of additional or alternative epoxy/elastomer or other adducts suitable for use in the present invention are disclosed in United States Patent Publication 2004/0204551.

The elastomer-containing adduct is included to modify structural properties of the adhesive film such as strength, toughness, stiffness, flexural modulus, and the like. Additionally, the elastomer-containing adduct may be selected to render the activatable material more compatible with coatings such as water-borne paint or primer system or other conventional coatings.

Curing Agents

By the term curing agent is meant a reactive component capable of either reacting with the phenoxy resin, or the epoxy functional group or polymerizing the epoxy functional group. The films of this invention are to be cured at elevated temperature, and they also contain one or more curing agents (hardeners) capable of accomplishing cross-linking or curing of certain of the adhesive components when the adhesive is heated to a temperature well in excess of room temperature.

There may be used as thermally-activatable or latent hardeners for the adhesive compositions of the present invention, for example, guanidines, substituted guanidines, substituted ureas, melamine resins, guanamine derivatives, blocked amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. For single-component, thermosetting adhesives, the selection criterion is, of course, the low solubility of those substances at room temperature in the resin system, so that solid, finely ground hardeners are preferred; dicyandiamide is especially suitable. Good storage stability at room temperature of the composition is thereby ensured. The amount of curing agent utilized will depend upon a number of factors, including whether the curing agent acts as a catalyst or participates directly in crosslinking of the composition, the concentration of epoxy groups and other reactive groups in the composition, the desired curing rate and so forth. Typically, the composition contains from about 0.5 to about 1 equivalents of curing agent per one equivalent of epoxy molecule.

Generally, such curing agents have relatively low molecular weights and reactive functionalities which are phenolic hydroxyl, amine, amide, or anhydride. Preferable curing agents are the monomeric and oligomeric amine functional polyarylenes wherein between the arylene groups are simple covalent bridges such as in the diaminodiphenyls, or connecting groups selected from the group consisting of alkylene of from 1-8 carbon atoms, ether, sulfone, ketone, carbonate, carboxylate, carboxamide and the like.

In one embodiment, the amine curing agent is a mixture of dicyandiamide (DICY) and bisurea and the composition is cured at 120° C. In another embodiment, the amine curing agent is a diaminodiphenylsulfone (DDS) and the curing temperature is 180° C. In certain embodiments, the curing agent is a combination of DICY and DDS.

Optionally curing agent accelerators may also be included. The amounts of curing agents and curing agent accelerators used can vary widely depending upon the type of structure desired, the desired properties of the structural adhesive and in the embodiment when the material is expandable the desired amount of expansion of the activatable material and the desired rate of expansion. Exemplary ranges for the curing agents or curing agent accelerators present in the structural adhesive range from about 0.001% by weight to about 7% by weight.

Epoxy Resins

The thermosetting resin formulations used to make the films of the invention usually contain epoxy resins. The epoxy resins that can be employed for the present invention are curable epoxy resins having a plurality of epoxy groups per molecule. In general, a large number of glycidyl ethers having at least about two epoxy groups per molecule are suitable as epoxy resins for the compositions used in this invention. The polyepoxides may be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), bisphenol S, bis(4-hydroxyphenyl)-I,I-isobutane, fluorene 4,4'-dihydroxybenzophenone, bis(4-hydroxyphenyl)-1,1-ethane, bisphenol Z (4,4'-Cyclohexylidenebisphenol), and 1,5-hydroxynaphthalene. In one embodiment, the epoxy resin includes EPON 828. Other suitable polyphenols as the basis for the polyglycidyl ethers are the known condensation products of phenol and formaldehyde or acetaldehyde of the novolac resin-type.

Other polyepoxides that are in principle suitable are the polyglycidyl ethers of polyalcohols, aminophenols or aromatic diamines. Particular preference is given to the liquid epoxy resins derived by reaction of bisphenol A or bisphenol F and epichlorohydrin. The bisphenol based epoxy resins that are liquid at room temperature generally have epoxy equivalent weights of from 150 to about 200. The epoxy resins that are solid at room temperature may also or alternatively be used and are likewise obtainable from polyphenols and epichlorohydrin and have melting point of from 45 to 130° C., preferably from 50 to 80° C. Typically, the composition may contain from about 25 to about 90 wt % (e.g., 25, 30, 35, 40, 45, 50, 55 wt %) of epoxy resin (unless otherwise stated, all concentrations set forth herein are expressed in terms of the weight percent of the component in question based on the adhesive composition as a whole).

Epoxy resins vary in reactivity and molecular weight and the epoxy resin used should be chosen to provide adhesive strength and also the desired viscosity during cure to prevent sag and flow. Mixtures of liquid and solid epoxy resins may be used.

As mentioned previously, the epoxy resins are not used alone, but are combined with suitable curing agents, catalysts, rheology control agents, tackifiers, fillers, elastomeric toughening agents, reactive diluents, soluble thermoplastics and other additives according to the properties required of the film.

The compositions used to produce the films of this invention may contain other ingredients such as one or more of the following i) polymers;
ii) blowing agents;
iii) fillers;
iv) flow control materials;
v) nano particles;
vi) pigments;
vii) flame retardants;
viii) fibres;
ix) moisture scavengers.

Other Additives

The compositions from which the films are made may contain known fillers such as the various ground or precipitated chalks, quartz powder, alumina, metallic aluminium powder, aluminium oxide, zinc oxide, calcium oxide, silver flakes, dolomite, graphite, granite, carbon fibres, glass fibres, textile fibres, polymeric fibres, titanium dioxide, fused silica, nano and hydrophobic grade silica (e.g., TS720), sand, carbon black, calcium oxide, calcium magnesium carbonates, barite and, especially, silicate-like fillers of the aluminium magnesium calcium silicate type, for example wollastonite and chlorite. Typically, the compositions used to produce the films of the present invention may contain from about 0.5 to about 40 wt % of fillers.

In another embodiment, the composition additionally contains one or more platy fillers such as mica, talc or clay (e.g., kaolin). The adhesive films of the present invention may also contain other common adjuvants and additives, such as plasticizers, non-reactive diluents, flow auxiliaries, coupling agents (e.g., silanes), adhesion promoters, wetting agents, tackifiers, flame retardants, thixotropic and/or rheology control agents (e.g., fumed silica, mixed mineral thixotropes), ageing and/or corrosion inhibitors, stabilizers and/or colouring pigments. Thixotropic agents such as silica or aramid fibre are particularly preferred as providing control of the viscosity of the adhesive formulation as it is heated to and held at the curing temperature. Depending on the requirements made of the adhesive application with respect to its processing properties, its flexibility, the required rigidifying action and the adhesive bond to the substrates, the relative proportions of the individual components may vary within comparatively wide limits.

For some end uses it may also be desirable to include dyes, pigments, stabilizers, thixotropic agents, and the like. These and other additives may be included in the thermosetting adhesive compositions described herein as needed and at levels commonly practiced in the composite art. Upon curing, the thermosetting adhesive compositions, inclusive of any such additives, will form a substantially single, continuous rigid phase.

Polymer or Copolymer

Depending upon the use to which the adhesive film is to be put, it may include one or more additional polymers or copolymers which may or may not contain functional groups, which can include a variety of different polymers, such as thermoplastics, elastomers, plastomers and combinations thereof or the like. For example, and without limitation, polymers that might be appropriately incorporated into the structural adhesive include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, polyvinyl chloride), poly(methyl methacrylate), polyvinyl acetate), poly (vinylidene chloride), polytetrafluoroethylene, polyisoprene, polyacrylamide, polyacrylic acid, polymethacrylate.

When used, these polymers can comprise a small portion or a more substantial portion of the material. When used, the one or more additional polymers preferably comprises about 0.1% to about 50%, more preferably about 1% to about 20% and even more preferably about 2% to about 10% by weight of the activatable material.

In certain embodiments, it may be desirable to include one or more thermoplastic polyethers and/or thermoplastic epoxy resins. When included, the one or more thermoplastic polyethers preferably comprise between about 1% and about 90% by weight of the formulation, more preferably between about 3% and about 60% by weight of the formulation and even more preferably between about 4% and about 25% by weight of the formulation. As with the other materials, however, more or less thermoplastic polyether may be employed depending upon the intended use of the film.

The thermoplastic polyethers typically include pendant hydroxyl moieties. The thermoplastic polyethers may also include aromatic ether/amine repeating units in their backbones. The thermoplastic polyethers preferably have a melt index between about 5 and about 100, more preferably between about 25 and about 75 and even more preferably between about 40 and about 60 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis(secondary)diamine, a cyclic diamine, a combination thereof or the like (e.g., monoethanolamine) with a diglycidyl ether or by reacting an amine with an epoxy-functionalized poly (alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093. Advantageously, the thermoplastic polyethers can provide the structural adhesive with various desirable characteristics such as desirable physical and chemical properties for a wide variety of applications as is further described herein.

Although not required, the formulation may include one or more ethylene polymers or copolymers such as ethylene acryllate copolymers, ethylene vinyl acetate copolymers. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

Blowing Agent

The invention envisages both non-expandable and expandable thermosetting adhesive films. If the film is expandable one or more blowing agents may be added for producing inert gasses that form, as desired, an open and/or closed cellular structure within the film. The material expansion can help to improve sealing capability, acoustic damping and particularly adhesion bonding to a substrate.

The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4,-oxy-bis-(benzenesulphonylhydrazide), trihydrazinotriazine and N,N,dimethyl-N,Ni-dinitrosoterephthalamide. An accelerator for the blowing agents may also be provided. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles (ureas).

Another class of blowing agents are physical blowing agents such as Expancel products marketed by Akzo-Nobel. These blowing agents consist of a polymeric particle with a volatile liquid in the centre. As the temperature is increased, the polymer shell softens and the gas inside the particle causes the polymer particle to expand. In this way, a foamed product is produced.

The amounts of blowing agents and blowing agent accelerators that are used can vary widely depending upon the type of cellular structure desired, the desired amount of expansion of the structural adhesive, the desired rate of expansion and the like. Exemplary ranges for the amounts of blowing agents and blowing agent accelerators in the activatable material range from about 0.001% by weight to about 5% by weight and are preferably in the structural adhesive in fractions of weight percentages.

Where the film is expandable the material may expand to at least 5% greater than its unfoamed size, at least 50% greater, at least 200% greater. It is also typically preferred that the volumetric expansion is such that the expanded volume is less than 400%, more typically less than 300%, even more typically less than 200% and possibly less than 100% relative to the original unexpanded volume.

Filler

The formulations from which the films of this invention are made may also include one or more fillers, including but not limited to particulate materials (e.g., powder), beads, microspheres such as Zeospheres available from 3M, or the like. Preferably the filler includes a material that is generally non-reactive with the other components present in the structural adhesive however, the surfaces may be treated to improve adhesion or compatibility with the adhesive matrix. While the fillers may generally be present to take up space at a relatively low weight and cost, it is contemplated that the fillers may also impart properties such as strength and impact resistance to the cured films.

Examples of fillers that may be used include silica, diatomaceous earth, glass, clay (e.g., including nanoclay), talc, pigments, colorants, glass beads or bubbles, glass, carbon or ceramic fibres, polyamide or aramid fibres (e.g., Kevlar), antioxidants, and the like. Such fillers, particularly clays, can assist the formulation in levelling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When determining appropriate components for the thermosetting adhesive film, it may be important to form the material such that it will only activate (e.g., flow, foam or otherwise change states) at appropriate times or temperatures. For instance the material should not be reactive at room temperature in an assembly environment. More typically, the adhesive film becomes activated at higher processing temperatures. As an example, temperatures such as those encountered in an automobile assembly plant may be appropriate, especially when the adhesive film is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher typically 130° C. to 190° C.

The following sets out the preferred amounts of the preferred components that may be employed in the films of this invention and the performance that they provide.

| | | |
|---|---|---|
| From 15 to 40 wt % | Phenoxy Resin | Provides flexibility and strength to the cured adhesive |
| From 15 to 30 wt % | Low molecular weight di-functional bisphenol A epoxy resin | Two functions: increases flexibility of the uncured film and its ease of impregnation with a fleece (when employed) increases Young modulus of cured adhesive |
| From 15 to 40 wt % | Nitrile rubber modified bisphenol F epoxy resin | Two functions: gives moderate Young modulus of cured adhesive increases toughness of cured adhesive |
| From 0.1 to −0.6 wt % (optional) | Mono-functional epoxy resin (reactive diluent) | Two functions: increases flexibility of the uncured film and its ease of impregnation with a fleece (when employed) may increase toughness of the cured adhesive |
| From 30 to 40 wt % | Butadiene rubber core shell impact modifier | Increases toughness of the cured adhesive |
| From 0.5 to 2 wt % | Methylene diphenyl bis (dimethyl urea) | Latent accelerator for the dicyandiamide cure of epoxy resins |
| From 13 to 6 wt % | Dicyandiamide | Curing agent for epoxy resins |
| Optionally from 0.2 to 1 wt % | Azobiscarboxamide | Foaming agent |

When employed, the fillers range from 10% or less to 70% or greater by weight of the formulation. According to some embodiments, the formulation may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

Other Components and Additives

Other additives, agents or performance modifiers may also be included as desired, including but not limited to an antioxidant, a UV resistant agent, a flame retardant, a heat stabilizer, a colorant, a processing aid, a lubricant, a reinforcement (e.g., chopped or continuous glass, ceramic, aramid, or carbon fibre, particulates or the like). Liquid polysufides particularly epoxidized may be used to improve the environmental exposure of the adhesive such as exposure to humidity and salt water.

The films of this invention are suitable for bonding together two or more substrates chosen from composites, metal, or honeycomb structures. The films are preferably non-tacky to the touch at room temperature and have good storage stability at room temperature. They are also suitable for bonding to oily surfaces such as the oily metal surfaces that may be encountered in automobile manufacture.

The adhesive films of this invention therefore have improved handleability and improved storage stability. Additionally the adhesive film is readily usable and cured at the temperatures experienced in the automobile anti-corrosion coating bake ovens in that they will retain adhesion to vertical and inclined surfaces at the cure temperature for the desired cure time which is no longer than the time to which the vehicle frame coated with the anticorrosion coating is exposed to the bake temperature, typically 20 to 40 minutes.

In one embodiment, the thermosetting adhesive film has a density of from 1.1 to 1.5. Such films can be supported by a carrier such as a fibrous carrier or fleece such as a woven or knit mat, or a random mat, derived from glass, polyester, polyamide, or other suitable polymeric materials or carbon or aramid fibres. The films of this invention can also be formed by coating or extrusion to produce unsupported films. The adhesive films of the present invention may be produced by extruding the formulations previously described at temperatures below that at which there is any significant activation of the epoxy curing agent such as at temperatures from 70 to 120° C. The formulation may be extruded as a film which for many uses becomes non-tacky to the touch when cooled to room temperature.

In certain instances however it would be useful if the films can be removably adhered to the substrate at temperatures below the activation temperature of the adhesive to retain the film in place prior to activation. This would be particularly useful where the film is to be used with vertical, inclined or contoured components such as the vertical A, B or C pillars of vehicle frames. This would enable a piece of film to be placed manually or robotically in the desired location and retained in that location and would also allow the piece of film to be moved if necessary. The invention therefore further provides tapes comprising a film of this invention provided with a tacky surface. Unlike some thermosetting adhesive tapes the tapes of this invention are storage stable, can be reeled and unreeled, cut easily and do not have an undesirable odour.

In a further embodiment the present invention therefore provides a thermosetting adhesive film of the invention provided with a tacky coating. Thermosetting adhesive films with a tacky surface are known for example, epoxy polyacrylate adhesive tapes are known in which the polyacrylate functions to provide tackiness to the film. However these films have an undesirable odour, additionally for certain applications they do not result in an adequately strong bond. The tack coating is preferably provided in an amount of 2 to 10 grams per square metre of the adhesive film.

We have now found that if a thermosetting adhesive film of the present invention is coated with a liquid, tacky resin that can be cured by the curative employed with the resin used in the film, the adhesive film can have sufficient tack to adhere to vertical and contoured surfaces prior to curing. Because the curing agent or curing agents employed with the resin have been selected so that there is no activation at ambient temperature whereby the film is storage stable the coating material will also not be activated and will remain tacky during any storage, transportation and application of the coated adhesive film. Furthermore the coated films can be stored for long periods of time, for example up to several months, at ambient temperature without significant loss of any of the mechanical properties of the bond when the adhesive is finally cured.

The present invention therefore provides an adhesive film or tape comprising a layer of a thermosetting film according to this invention containing one or more curing agents coated with a layer of a second tacky resin that is capable of being cured by at least one of the curing agents within the first curable resin.

The second tacky resin is preferably free of curing agent.

The second tacky resin may be applied to the adhesive film at any stage in the film manufacturing process. It may be applied at the point of manufacture of the adhesive film in which case it is desirable to provide a release layer on top of the coating layer to enable reeling and unreeling, transportation and storage of the film. Alternatively the coating may be applied at the point of use of the adhesive film.

As mentioned the second tacky thermosetting resin of the coating may be a polyester resin, a polyurethane or an epoxy resin of the types previously discussed. Epoxy resin being preferred. The second thermosetting resin should be such that it imparts a tacky surface to the adhesive film at ambient temperature and is preferably provides a liquid surface film at ambient temperature. It is preferably a liquid resin having a viscosity at 25° C. of 1000 to 20,000 MPas so that it can be applied to and retained by the surface of the film based on the first thermosetting resin formulation. Alternatively although not preferred it can be applied as a solution and solvent removed to provide the desired tacky surface. Any suitable coating technique may be used. It is preferred that the coating be made by using the tackifying material at from 1 to 10 grams per square metre of the film.

The adhesive films of this invention are suitable for bonding together two or more substrates made from materials chosen from composites, metal, or honeycomb structures. The films have good storage stability at room temperature. They are also suitable for bonding to oily surfaces such as the oily metal surfaces that may be encountered in automobile manufacture. We have also found that they are useful for bonding together heavy structures which may be porous, and may have uneven or roughly profiled surfaces. They are also useful in bonding together substrates derived from materials with different coefficients of thermal expansion.

The adhesive films of this invention may be provided with a fibrous porous support such as a fibrous layer or fleece. Fibrous materials embedded in a matrix of the thermosetting resin such as epoxy resins are well known and are commercially available as what are sometimes known as prepregs. The prepregs are used in the manufacture of articles usually by the laying up of several prepregs in a stack and curing the stack in a mould to produce a finished article such as an automobile or aircraft component, wind turbine blade or sporting goods. In this technology the resin is cured to bond several prepregs together. The present invention is however concerned with the use of a thermosetting adhesive film to bond together substrates other than layers of the fibrous support and is particularly concerned with the use of an adhesive comprising a thermosetting resin supported on a fibrous material for the bonding together of substrates derived from different materials in particular the bonding together of metal such as steel and/or aluminium to fibre reinforced composites such as glass fibre, carbon fibre or aramid filled epoxy or polyester resins. Accordingly the thermosetting resin performs a different function from that performed in a prepreg.

The structural adhesives films of this invention may be used to improve the stiffness of automobiles so reducing the likelihood of vehicle roll over, improving vehicle ride characteristics and increasing vehicle durability and fatigue life.

In the embodiment in which the adhesive film is provided with a support such as a fibrous layer or fleece made, for example, from glass fibre, carbon fibre or aramid the fibrous layer or fleece not only supports the adhesive but can improve the properties of the cured adhesive. The fibres within the fibrous layer or fleece may be unidirectional or multidirectional depending upon the direction in which the strength is required. The adhesive formulation can be adapted to have a viscosity at its deposition temperature such as the extrusion temperature that it can readily impregnate such a fibrous fleece upon contact therewith extrusion, perhaps with the provision of a roller to press the viscous adhesive formulation into the interstices of the fleece.

The film of the invention may be used in a structure comprising a fibrous support such as a fleece and an uncured adhesive film of the invention. The uncured film may be on one or both sides of the fibrous fleece and may also impregnate the interstices of the fibrous fleece. Such a structure may be produced by a process in which thermosetting adhesive formulation which may be epoxy based is extruded at a temperature in the range 70 to 120° C. as a film onto a moving fibrous fleece. It is preferred that the formulation contain a phenoxy resin, a core/shell polymer, an epoxy modified elastomer and a curing agent as previously described.

The adhesive films of the present invention may be used in various articles of manufacture for adding structural integrity to portions or members of articles. Examples of such articles of manufacture include, without limitation, household or industrial appliances, furniture, storage containers, buildings, structures or the like. In preferred embodiments, the adhesive film is used for bonding portions of an automotive vehicle or aircraft such as body or frame members (e.g., a vehicle frame rail) of the automotive vehicle.

The present invention therefore provides a film that can be cured to produce a structural adhesive. The film is solid and can be dry to the touch and is storage stable at room temperature. The film can be activated to develop adhesive properties at an elevated temperature.

The cured adhesive film has a good elongation at breaking, good Lap Shear, good T Peel and good performance in the Wedge Impact Test over the range of temperatures and environmental conditions to which the film may be subjected flexibility, and protection against the propagation of flaws. Other desirable properties include good adhesion durability under various types of exposure conditions such as high humidity, salt water and high and low temperatures such as from sub-zero conditions experienced by aircraft to the high temperatures experienced by land vehicles in extreme climates with maintenance of the physical properties over time. In certain applications a high elastic modulus, a high Tg, high strain to failure and other physical properties may be desired.

The preferred thickness of the thermosetting adhesive films of the present invention will be selected according to the use to which the film is to be put. However films of thickness from 0.3 mm to 2 mm are preferred. The films of this invention are useful in many applications where strong bonds are required. In particular they are useful in bonding together substrates having different coefficients of thermal expansion. One particular use is in the bonding of metals such as steel and aluminium which have high coefficients of expansion to fibre reinforced resins such as glass, carbon or aramid fibre filled epoxy or poly urethane based resins which have low coefficients of thermal expansion. Additionally the films may be used to obtain a satisfactory bond when one or more of the surfaces is an oily surface.

The invention therefore provides a cured adhesive film derived from a thermosetting adhesive film of the present invention which may incorporate a fibrous layer or fleece as herein before described. In a further embodiment the invention provides a laminar structure comprising a metal substrate and a fibre reinforced resin substrate bonded together by an adhesive film of the present invention.

The cured composition provided by the present invention is capable of exhibiting high peel and shear strengths in the temperature range of −55° C. to +120° C. In the cured state, these adhesives display performance necessary for many end-use applications especially in the manufacture of aircraft structures and high end automobiles. The toughness of the resin matrix may be adjusted, for example, by varying functionality of epoxy resins (di- or tri or tetrafunctional) leading to change in the crosslink density.

The invention is illustrated by reference to the following examples.

EXAMPLE 1

An adhesive film was prepared by blending the following materials.

| Component | % |
|---|---|
| CTBN modified epoxy resin (1600 g/Eq) | 6.00% |
| Epoxy resin (900 g/Eq) | 5.00% |
| Micronized grade of dicyandiamide (<50 micrometers) | 5.00% |
| Aromatic substituted urea (latent accelerator for the dicyandiamide cure of epoxy resins) | 0.60% |
| Calcium oxide (<70 micrometers) | 5.00% |
| Calcium carbonate (<70 micrometers) | 18.40% |
| Epoxy resin (200 g/Eq) | 16.00% |
| Methacrylate-butadiene-styrene (MBS) Coreshell impact modifier: crosslinked poly (butadiene/styrene) core with a grafted polymethyl methacrylate shell | 16.00% |
| Epoxy Phenol Novolac Resin | 8.00% |
| Phenoxy Resin | 15.00% |
| Silica (<50 nanometers: 40%) reinforced bisphenol F based epoxy resin | 5.00% |

Figure 1:
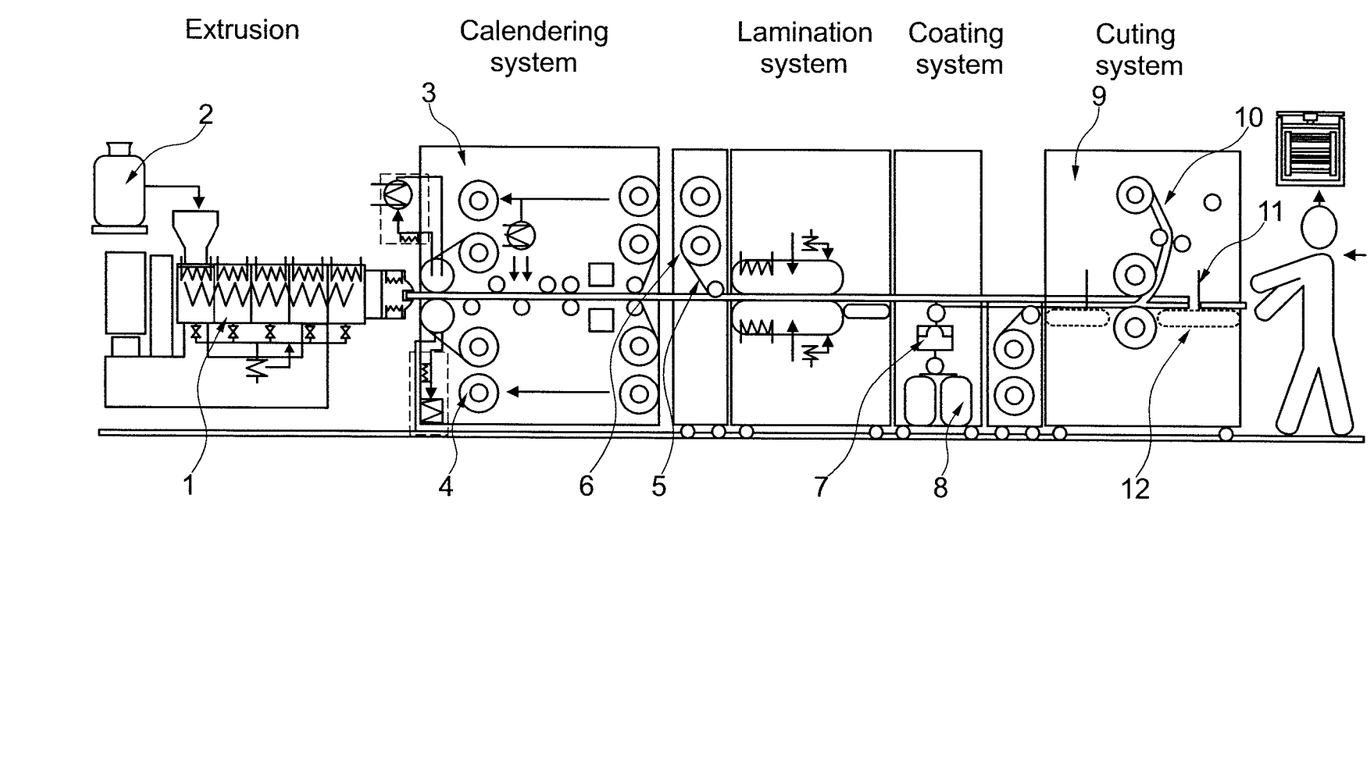

The formulation was extruded from a twin-screw then calendared to make a film as illustrated in FIG. 1 hereto.

The temperatures in the different extruder zones were:

| | |
|---|---|
| Zone 1 | 30 |
| Zone 2 | 60 |
| Zone 3 | 85 |
| Zone 4 | 110 |
| Zone 5 | 100 |
| Zone 6 | 100 |
| Zone 7 | 90 |
| Zone 8 | 80 |
| Zone 9 | 80 |
| Zone 10 | 80 |
| Zone 11 | 80 |

The temperature of the calendar cylinder is between 80 and 90° C.

The calendared film had a thickness between 0.3 and 2 mm.

The adhesive film was used to bond two steel plates. The curing conditions was heating at 165° C. for 20 minutes.

Lap shear strength: 30 MPa/Cohesive failure

EXAMPLE 2

Tape Manufacturing

A tacky film (a tape) was made by applying a liquid epoxy resin on at least one of the two surfaces of the Adhesive Film of Example 1.

The liquid resin used for the tacky coat can be
a Bisphenol-A based epoxy resin or
a Bisphenol-F based epoxy resin
The liquid resin can also be:
the same than then liquid resin used in the formula of the Adhesive film.
Different from the liquid resin used in the formula of the Adhesive film.

Example 2A: the liquid resin is a Bisphenol-A based epoxy resin and is the same as the liquid resin used in the formula of the Adhesive film.

Example 2B: the liquid resin is a Bisphenol-A based epoxy resin and is different from the liquid resin used in the formula of the Adhesive film.

The mechanical performances of bonded assemblies using the Adhesive Films of Examples or the Adhesive Tapes of Examples 2A and 2B are almost the same. The Adhesive Tapes have a slightly higher lap shear strength and a slightly lower peel strength.

The manufacture of films according to the present invention is illustrated by reference to the accompanying drawing II in which FIG. 1 shows the manufacturing line comprising an extruder (1) to which the first thermosetting resin system (2) is fed. The first thermosetting resin system is extended at about 80° C. and passes into a calendaring system (3) where it is calendared by passage through pressure rollers (4) to the required thickness.

Optionally, the calendared extrudate may then pass to a laminate system where it is laminated to a fibrous layer (5) provided from reels (6). As a further option the laminate may then be passed to a coating system where it is coated with a second tacky thermosetting resin (7) supplied from tanks (8) from which it passes to a cutting system (9) where a release liner (10) can be provided on the tacky surface and the film or tape can be cute by a knife (11) into sections (12) of the desired length.

When the film is to be used without a supporting fibrous layer and without a tacky layer it may pass directly to the cutting station. Similarly if a laminate with a fibrous layer is required without a tacky layer the laminate may pass directly to the cutting station after lamination.

The invention claimed is:

1. An article comprising:
a curable thermosetting epoxy resin based adhesive film,
a coating of liquid, tacky epoxy resin free of a curing agent applied to the adhesive film, and
a release liner disposed on the coating so that the article is adapted for reeling and unreeling at room temperature,
wherein the adhesive film is;
i) non-tacky to the touch at room temperature:
ii) flexible prior to cure: and
iii) storage stable;
wherein the adhesive film is derived from a mixture of:
a.) phenoxy resin;
b.) an elastomer/epoxy resin adduct;
c.) a core shell material; and
d.) a curing agent;
wherein the adhesive film is configured to form an adhesive bond with a metal surface having a corrosion preventive oi;
wherein the adhesive bond has a shear strength of no less than about 90% or more of an adhesive bond between the adhesive film and a metal surface free of corrosion preventive oil when the metal surface is provided with a layer of about 3 g/m² of the corrosion preventive oil, and
wherein the coating is configured to be cured by the curing agent of the adhesive film.

2. The article according to claim 1, wherein the adhesive film can be cured in no more than 45 minutes at a temperature no higher than 190° C.

3. The article according to claim 2, wherein the adhesive film is foamable.

4. The article according to claim 1, wherein the adhesive film can be cured at a temperature in the range 130° C. to 190° C.

5. The article according to claim 4, wherein the adhesive film has an uncured thickness between 0.2 and 3.0 mm.

6. The article according to claim 4, wherein the adhesive film has a density of from 1.1 to 1.5 g/ml.

7. The article according to claim 1, wherein the adhesive film contains from 15 to 40 wt % of the phenoxy resin, from 5 to 40 wt % of the elastomer epoxy resin adduct, and from 5 to 25 wt % of the core shell material.

8. The article according to claim 7, wherein the article is supported by a carrier.

9. The article according to claim 8, wherein the carrier is a fibrous carrier or fleece selected from: a woven mat, a knit mat, or a random mat; and wherein the fibrous carrier or fleece is derived from: glass, polyester, polyimide, carbon, or aramid fibers.

10. The article according to claim 9, wherein the adhesive film is an uncured film and the article is on one or both sides of the fibrous carrier.

11. The article according to claim 7, wherein the adhesive film is a cured adhesive film derived from the curable adhesive film.

12. The article according to claim 11, wherein the article includes a fibrous carrier.

13. The article according to claim 12, wherein the cured adhesive film has a lap sheer resistance greater than 20 mPa.

14. A laminar structure comprising a metal substrate and a fiber reinforced resin substrate, wherein the cured adhesive film of the article according to claim 11 is released from the release liner and bonds the metal substrate and the fiber reinforced resin substrate together.

15. The article according to claim 7, wherein the adhesive film contains 0.001 to 7% by weight of the curing agent.

16. The article according to claim 15, wherein the curing agent includes a curing agent accelerator.

17. The article according to claim 1, wherein the coating is a bisphenol-A or bisphenol-F based epoxy resin.

18. The article according to claim 1, wherein the coating is applied to only one surface of the adhesive film.

19. The article according to claim 1, wherein the coating is applied to opposing surfaces of the adhesive film.

20. A process for the manufacture of the article of claim 1, comprising extruding the adhesive film
at a temperature in the range 70 to 120° C. and calendering the extrudate to a thickness in the range 0.3 to 2 mm.

* * * * *

UNITED STATES PATENT AND TRADEMARK OFFICE
CERTIFICATE OF CORRECTION

PATENT NO. : 10,577,523 B2
APPLICATION NO. : 14/907164
DATED : March 3, 2020
INVENTOR(S) : Ira Miller et al.

Page 1 of 1

It is certified that error appears in the above-identified patent and that said Letters Patent is hereby corrected as shown below:

In the Claims

Column 21, Lines 46 and 47, Claim 1 delete "a corrosion preventive oi:" and insert --a corrosion preventive oil;--

Signed and Sealed this
Fourth Day of August, 2020

Andrei Iancu
*Director of the United States Patent and Trademark Office*